United States Patent [19]
Tamura et al.

[11] Patent Number: 6,079,046
[45] Date of Patent: Jun. 20, 2000

[54] DYNAMIC DATA TRANSFER BANDWIDTH CONTROL

[75] Inventors: Tetsuya Tamura, Yamato; Masayuki Demura, Ebina; Hiroshi Itagaki, Yamato; Kohji Yamada, Moriyama, all of Japan

[73] Assignee: International Business Machines Corporation, Armonk, N.Y.

[21] Appl. No.: 09/057,998

[22] Filed: Apr. 9, 1998

[30]       Foreign Application Priority Data

Apr. 9, 1997   [JP]   Japan ................................... 9-089844

[51] Int. Cl.[7] .................................................. H03M 13/00
[52] U.S. Cl. ........................... 714/781; 714/774; 714/785
[58] Field of Search ..................... 714/781, 785, 714/774; 375/219, 222; 370/209, 342, 433

[56]               References Cited

U.S. PATENT DOCUMENTS

5,699,369   12/1997   Guha ........................................ 714/774
5,793,744   8/1998   Kanerva et al. ......................... 370/209

*Primary Examiner*—Emmanuel L. Moise
*Attorney, Agent, or Firm*—G. Marlin Knight

[57]               ABSTRACT

It is one object of the present invention to perform efficient data transfer processing wherein, during decoding using a combination of product coding and erasure correction, real-time correction can be performed. To achieve the above object, provided is a method whereby a transfer mode is dynamically altered, in accordance with the state of a decoder, and in additional buffer, consisting of two banks, is added, so that the speed for the data transferring relative to the decoder is increased.

27 Claims, 8 Drawing Sheets

DYNAMIC DATA TRANSFER BANDWIDTH CONTROL

BACKGROUND OF THE INVENTION

1. Field of the Invention

The present invention relates to a method of transferring data using an efficient transfer function and a system therefor, and in particular to the efficient data transfer for DVD type devices. More specifically, the present invention pertains to a dynamic data transfer bandwidth control method which dynamically adjusts bandwidth and transfer mode in accordance with the state of a decoder, e.g. error correction condition, and to a system therefor.

2. Description of Related Art

In the DVD field, a so-called "product" coding method, whereby many errors can be corrected by employing a relatively simple device, is employed as a coding method. Product coding has two distinct levels of coding whereby data are arranged in a rectangular shape with each row and column being encoded using an error correction code. This coding method is frequently used for communication devices and for storage devices, but it has a shortcoming in that it requires a longer period of time for decoding than does a one level coding method.

Figure 1:
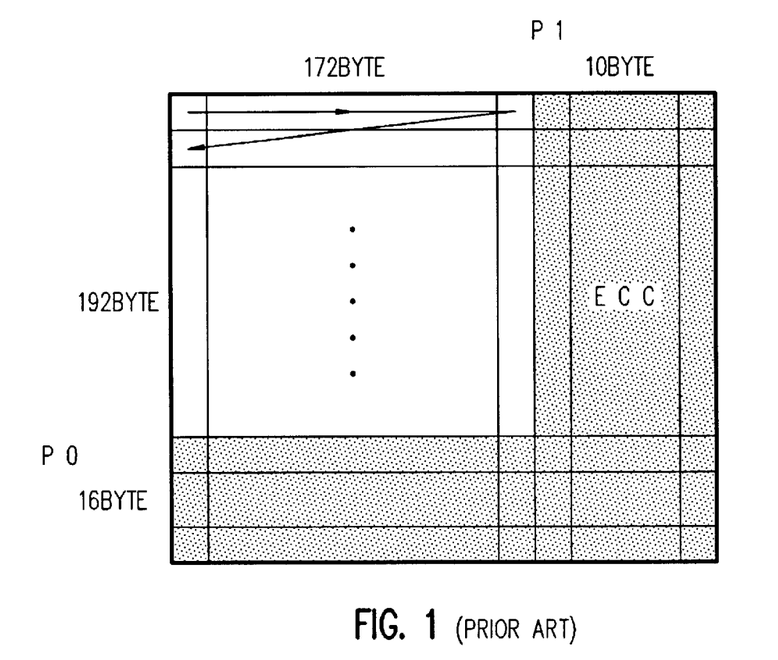
FIG. 1 is a diagram illustrating the prior art format of a data portion in a DVD.

The format for a data portion on a DVD, for example, is shown in FIG. 1. The data are first arranged horizontally in rows, and when one row is filled with data, data is stored horizontally in the next row. In FIG. 1, PI and PO respectively denote an inner code parity and an outer code parity. Encoding is performed, first vertically and then horizontally.

The basic method for decoding is as follows.

(1) The maximum number of errors to be corrected is limited to about half of the maximum correction ability of the code, and row data (PI) correction processing is performed. That is, first the syndrome calculation is performed, and by using the result obtained, the number of errors is calculated. When the number of errors is small, the locations and the values of errors are calculated and error correction for them is performed. When the number of errors is large, pointers to rows in which there are errors are set and error correction is halted (random error correction+addition of erasure pointers).

(2) Erasure correction is performed for each column (PO) based on the pointers set in step (1).

Several variations of methods are used, such as a method that provides for the columns and rows to be exchanged to perform error correction, or one according to which error correction is partially performed in one direction before erasure pointers are set.

A supplemental explanation will be given for the erasure correction. Assume that, as the definition for erasure, the location where an error has occurred is detected but the value of error is unknown. When the number of erasures is h and the number of ordinary errors is e, it can be proved that so long as $2e+h+1 \leq d$ is satisfied by the Reed-Solomon coding (or more generally, BCH coding), the errors and erasures can be obtained (d is a coding Hamming distance). Since the Hamming distance of the DVD outer code is 17, a maximum 16 erasures can be corrected if only erasures are present. The erasure locations required for erasure correction using the outer code are provided by decoding of inner code in DVD.

Figure 2:
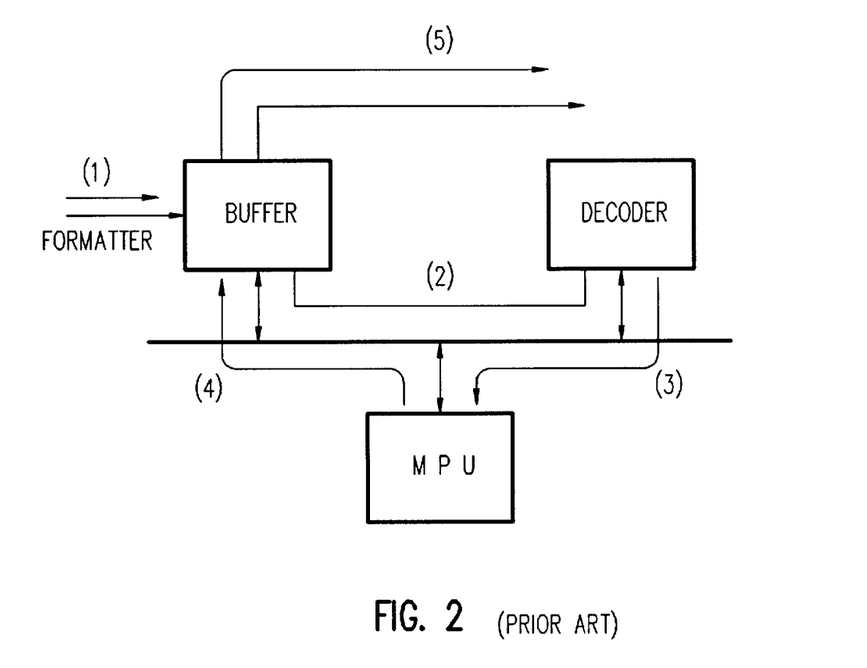
FIG. 2 is a block diagram of the prior art illustrating the relationship between a decoder and a buffer.

The relationship between a circuit (decoder) for performing error calculation and a buffer is shown in FIG. 2. In FIG. 2, data flow during reading is indicated by (1) through (5). Upon the receipt of an I/O request from a formatter, an MPU and a decoder, a buffer allocates a band in accordance with a schedule that is provided in advance.

The following two problems arise at this time.

(1) When column and row data processing is to be performed, as memory access methods differ (sequential access and random access), a fast memory access procedure, such as page mode access, can not be performed in both directions.

(2) When the number of errors to be corrected is increased, error correction for an entire block can not catch up because the access by the MPU is performed at random.

The data transferring using this product coding could cause deterioration of the data transfer efficiency because of an increase in the required processing time, which is accompanied by the use of different memory access methods for row and column data and by an increase in the number of errors to be corrected.

A conventional example for enhancing the data transfer efficiency is "a data transferring device" disclosed in Japanese Unexamined Patent Publication No. Sho 54-77002. According to this technique, when the number of errors along a transfer path reaches a specified value or higher, the probability that errors will occur during the data transferring can be reduced by changing from one bandwidth to another bandwidth (i.e., another transfer speed), in which noise has no effect on the data transfer, so that the baseband transfer efficiency is increased.

According to this technique, however, when the probability of error occurrences can not be reduced by changing the bandwidth, no improvement in the data transfer performance can be expected, and when the transfer speed can not be altered, this device can not be employed. For a storage device, the above described condition is equivalent to a case where an error is caused by a defect on a recording medium or a case where the rotational speed of a recording medium can not be changed.

SUMMARY OF THE INVENTION

According to the present invention, disclosed is a new technique that resolves the above shortcomings, i.e., a technique by which the data transfer performance can be improved even when errors occur regardless of the bandwidth employed for the transfer of data, or even when the bandwidth employed for the data transferring can not be altered. It is therefore one object of the present invention to perform efficient data transfer processing wherein, even though many errors occur during decoding using a combination of product coding and erasure correction, the erasure correction can be performed and at the same time data can be read from a host (PC) without deterioration of the transfer performance, so that real-time correction (on-the-fly correction) can be performed.

To achieve the above object, provided is a method whereby a transfer mode is dynamically controlled, in accordance with the state of a decoder, and an additional buffer, consisting of two banks, is added, so that the speed for the data transfer relative to the decoder is increased.

DETAILED DESCRIPTION OF THE PREFERRED EMBODIMENTS

Figure 3:
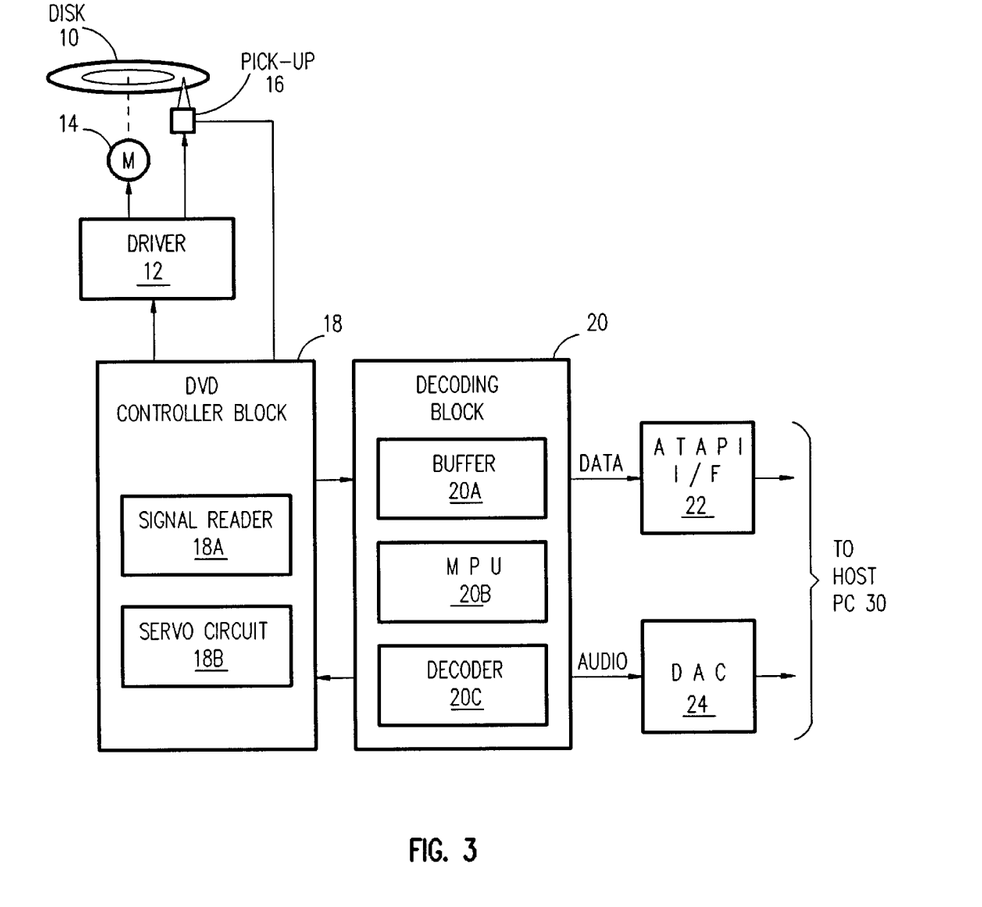
FIG. 3 is a block diagram illustrating one embodiment where the present invention is applied for the transfer of DVD data.

FIG. 3 is a diagram illustrating the arrangement of a DVD playing system wherein the present invention is applied for DVD data transfer. In FIG. 3, a disk 10 is turned by a motor 14 connected to a driver 12, and data recorded on the disk 10 is read by an optical pick-up 16. The driver 12 is actuated by a command from a DVD controller block 18. A signal read by the pick-up 16 is input to the DVD controller block 18, amplified, as needed, converted, and the resultant signal is sent to a decoding block 20. The DVD controller block 18 includes a signal reader 18A and a servo circuit 18B, for receiving servo data recorded on the disk 10 or a control signal from the decoding block 20 for controlling the driver 12.

Error correction is performed for the data, which are received by the decoding block 20 which includes a buffer 20A, an MPU 20B and a decoder 20C which are connected by a common bus. The data are decoded in real time and the decoded data is sent to a host (a personal computer, etc.) 30. Video data are sent to the PC 30 via an ATAPI interface (ATA Packet Interface) 22, and audio data are sent to the PC 30 via a DAC (Digital Analog Converter) 24.

Figure 4:
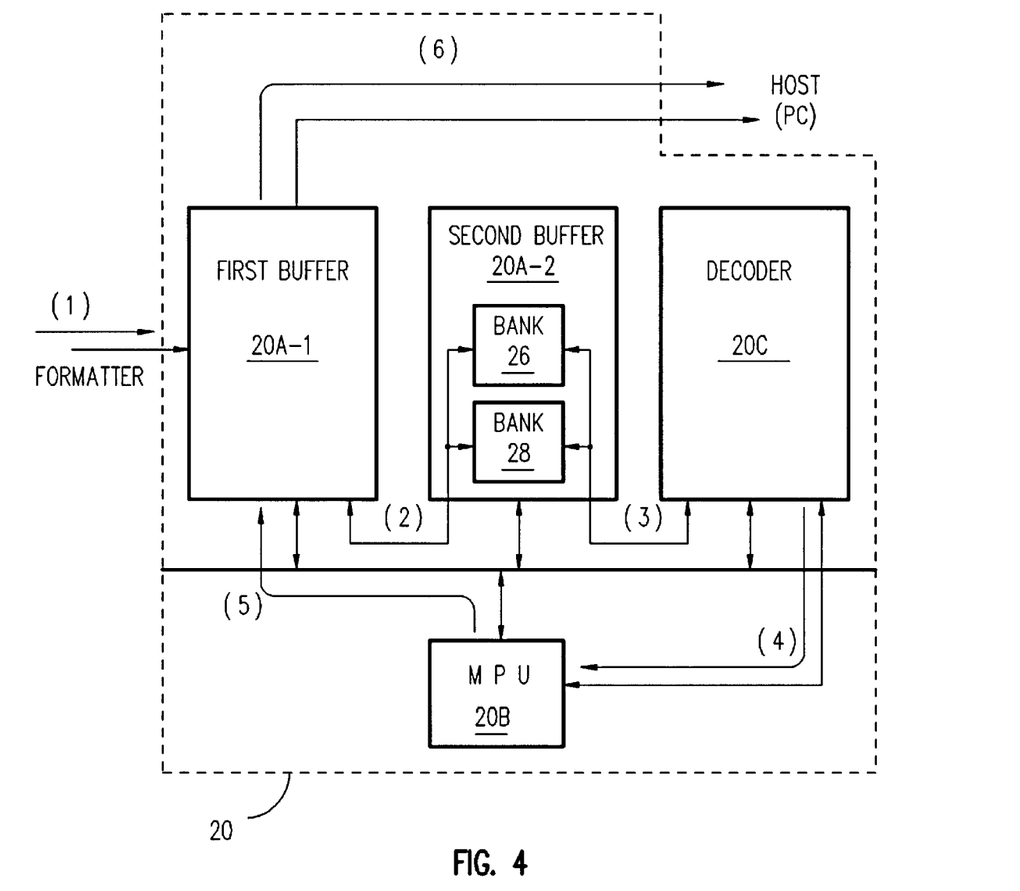
FIG. 4 is a detailed diagram illustrating the arrangement of a decoding block in an embodiment of the invention.

FIG. 4 is a detailed diagram illustrating the decoding block 20 in the embodiment. In FIG. 4, the buffer 20A of FIG. 3 is composed of a first buffer 20A-1 and a second buffer 20A-2. The second buffer 20A-2 has two banks 26 and 28. It is desirable that the two banks 26 and 28 have sufficient storage capacity for six rows of data in a DVD data block. In addition, it is desirable that the first buffer 20A-1 be DRAM and the second buffer 20A-2 be SRAM in order to perform the fast transfer of data to a decoder 20C.

In FIG. 4, data flows from (1) to (6), as in FIG. 2. When row data are located at sequential addresses in the first buffer 20A-1, i.e., when row data processing is to be preformed, a fast transfer mode can be employed for the data transferring between the first buffer 20A-1 and the second buffer 20A-2.

To implement real-time correction (On-the-fly correction) during the decoding process, it is necessary for error correction for one block to be completed within a period wherein data for one block is transferred. Otherwise, if errors exist sequentially, the first buffer 20A-1 will be filled with a block for which error correction has not yet been completed, reading from the head will have to be halted and reading performance will be deteriorated. As one more important consideration, since the total performance will also be deteriorated when the number of errors is increased and the MPU 20B can not spare the time for jobs other than error correction, the time for executing another job during a certain period of time must be ensured. To perform the data transferring efficiently, the following method is employed for dynamically altering a transfer mode in accordance with the state of the decoder 20C.

1. Column data having a size greater than one word, for which the high speed page mode data transferring is effective, are transferred from the first buffer 20A-1 to the second buffer 20A-2. When the data size is six words, for example, the data transfer speed can be three times that employed for word transfer (specific band allocation will be explained later).

Since in error correction for columns, there are many data required for error correction, they are written to the second buffer 20A-2. In order to avoid a conflict between the buses, two banks having sequential addresses are regarded as a single bank. When all the data rows have been transferred, the data for 12 rows are stored in the second buffer 20A-2. The data transferring to the second buffer 20A-2 and the data transferring to the decoder 20C are alternately performed, and the transfer of data from the second buffer 20A-2 is halted until all the error locations and the error values for the data are acquired.

2. The data transfer from the second buffer 20A-2 to the decoder 20C is always resumed at the time the decoder 20C acquires the error location polynomial and the error evaluation polynomial provided by the Euclidian algorithm and detects the number of errors.

3. To transfer row data from the first buffer 20A-1 to the second buffer 20A-2, two banks are alternately used. When one of the banks is filled with data, i.e., when data for six rows are held in the second buffer 20A-2, the calculation of errors and their locations in the data is begun and is completed during the data transferring to the next bank.

4. A Wait can be set by the MPU 20B during the data transfer from the first buffer 20A-1 to a bank, so that the MPU 20B can handle a request for processing other than the correction of data errors for row. The error correction is performed during the data transferring to the next bank. By limiting the amount of error correction for rows, it is also possible for a Wait to be removed that affects the transfer of row data and for the Burst mode to be used to transfer data from the first buffer 20A-1 to the second buffer 20A-2.

5. The process performed by the decoder 20C is divided into three stages.
   (1) syndrome calculation
   (2) calculation of an error (erasure) location polynomial and an error evaluation polynomial using the Euclidian algorithm
   (3) calculation of the locations and the values of errors (erasures) using a Chien search.

Since the syndrome calculation can be performed at the same time as the data transferring from the second buffer 20A-2, and since data for a plurality of rows (or columns) are present in either direction in the second buffer 20A-2, the data transferring from the second buffer 20A-2 and the Chien search are combined in a pipeline to enhance parallel processing.

6. When the number of errors (the total amount of the erasure pointers), which are detected as the result of the processing performed by the inner code, exceeds a threshold value r1 (r2), the bandwidth on the ATAPI (HOST) side is lowered to raise the bandwidth between the MPU 20B and the first buffer 20A-1, so that the column data processing speed can be increased. Assuming that a 5-clock cycle is required for the access by the MPU 20B, the bandwidth on the ATAPI side is reduced by 5 (10) words, and the bandwidth on the MPU 20B side is increased by 1 (2) word.

7. If too many errors exist in the column data, error correction can not be completed in the period allocated for the transfer of data from the second buffer 20A-2. Therefore, a Wait is inserted before the data transferring from the first buffer 20A-1 to the second buffer 20A-2 is started again.

Figure 5:
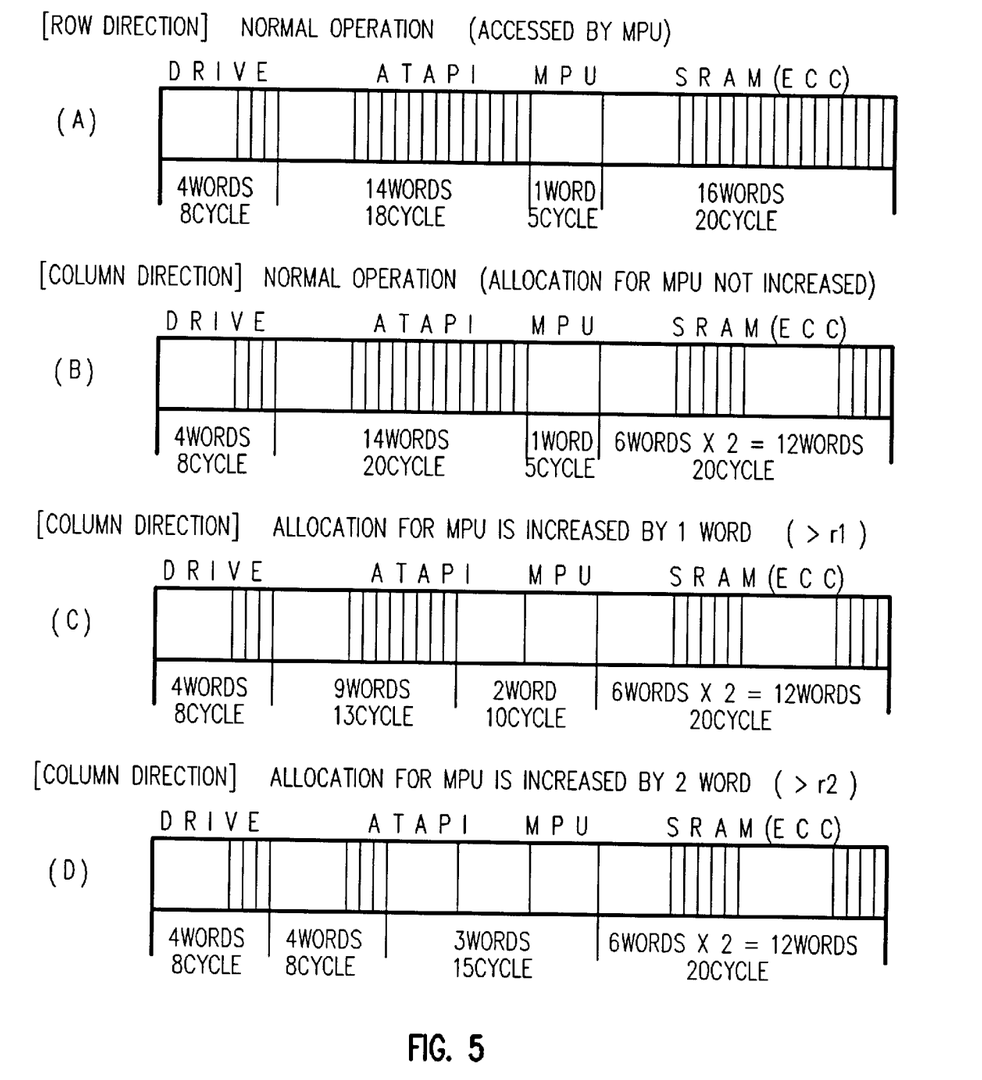
FIG. 5 is a diagram showing the allocation of a bandwidth for rows and columns in the first buffer according to an embodiment invention.

For a double speed CLV DVD, the maximum data transfer speed is 27 Mbit/s. When the maximum transfer speed relative to an external interface is 20 MB/s, FIGS. 5(A) and 5(B) should be referred to for the allocation of bandwidth, in the row direction and column direction in the first buffer 20A-1, that satisfies the above transfer speed. In these examples, a bandwidth for memory is controlled by using 1.275 æs (51 clocks 25 ns/clock) as one cycle.

When the bandwidth for columns allocated to the MPU 20B in FIG. 5(C) is increased by one word (>r1), allocation for the MPU 20B is performed sequentially. This allocation condition is the one existing at the time individual data transfers are arbitrarily completed. With this allocation, the MPU 20B can both smoothly access external RAM and perform calculations using internal registers without disturbing the pipeline.

When the bandwidth for columns allocated to the MPU 20B in FIG. 5(D) is increased by two words (>r2), allocation for the MPU 20B is performed sequentially. The locations are arbitrary locations for individual transfer allocations.

Figure 6:
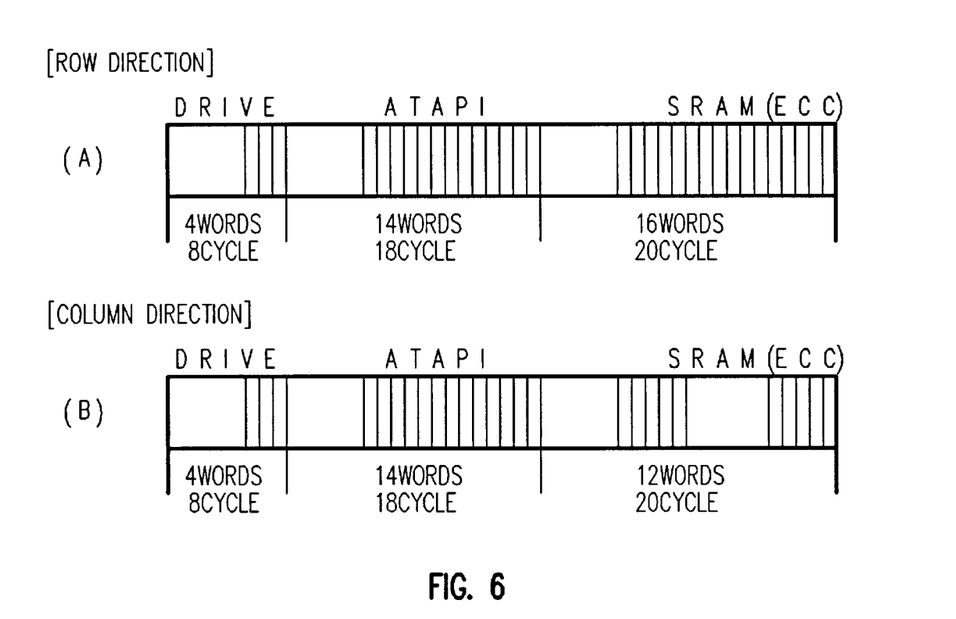
FIG. 6 is a diagram showing the allocation according to an embodiment of the invention of a bandwidth when there is no access by an MPU.

In FIGS. 6(A) and 6(B) are shown a case where there is no access by the MPU 20B. In FIG. 5, a five-clock cycle for an access by the MPU 20B is eliminated, and the total length, i.e., the length of the total cycles, is 1.15 æs=(46 clocks 25 ns).Eight cycles that are assigned to "DRIVE" in FIG. 6 are used for writing and reading relative to a medium, and can not be altered. Therefore, the alteration of a bandwidth (transfer speed) for the data transfer, which is disclosed in Japanese Unexamined Patent Publication No. Sho 54-77002, can not be employed in this case. Since the cycles also correspond to the transfer speed for a drive other than a double speed CLV DVD, the total number of cycles and the number of cycles allocated for individual transfers are defined as variables.

Figure 7:
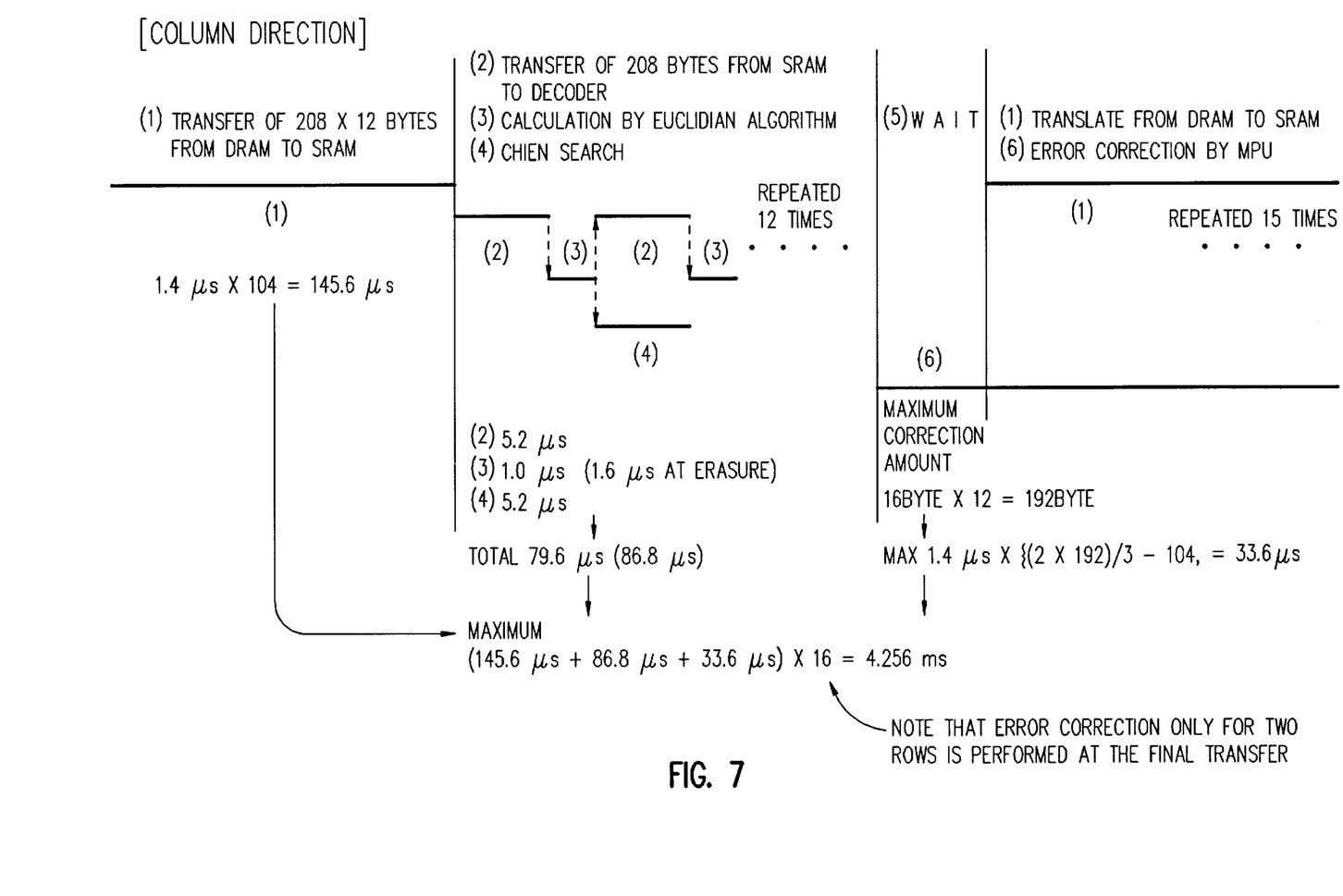
FIG. 7 is a diagram showing the flow of the transfer of column data and decoding according to an embodiment of the invention.

FIG. 7 is a diagram showing the transfer of column data and the decoding that are based on a bandwidth provided as above. In FIG. 7, it is assumed that the MPU 20B accesses the first buffer 20A-1 twice for error correction (if there are three banks, data can be acquired from the second buffer 20A-2 before it is corrected, so that only one access of the first buffer 20A-1 is required), and that a bandwidth of 3 words/1.4 æs is allocated for the MPU 20B for error correction. The actual bandwidth allocated for the MPU 20B is determined by the number of cycles set for a Wait and by the total number of errors. The relationship between the access count and the total error count when a Wait is set to 0, for example, is shown in FIG. 8.

Figure 8:
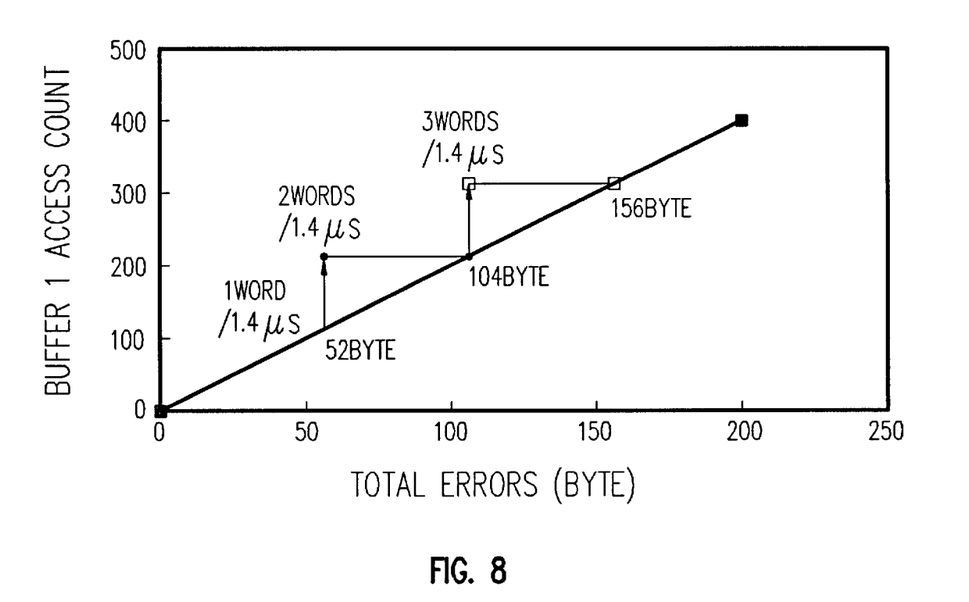
FIG. 8 is a graph showing the relationship between the access count and the total number of errors when Wait is set to 0 according to an embodiment of the invention.

In FIG. 8, r1 and r2 are 52 and 104. Since in the errors there are 156 bytes or more, error correction can not be completed within the period of time allocated for a transfer. The easiest way to correct this is to insert a Wait of 1.4 æs 24=33.6 æs.

Figure 9:
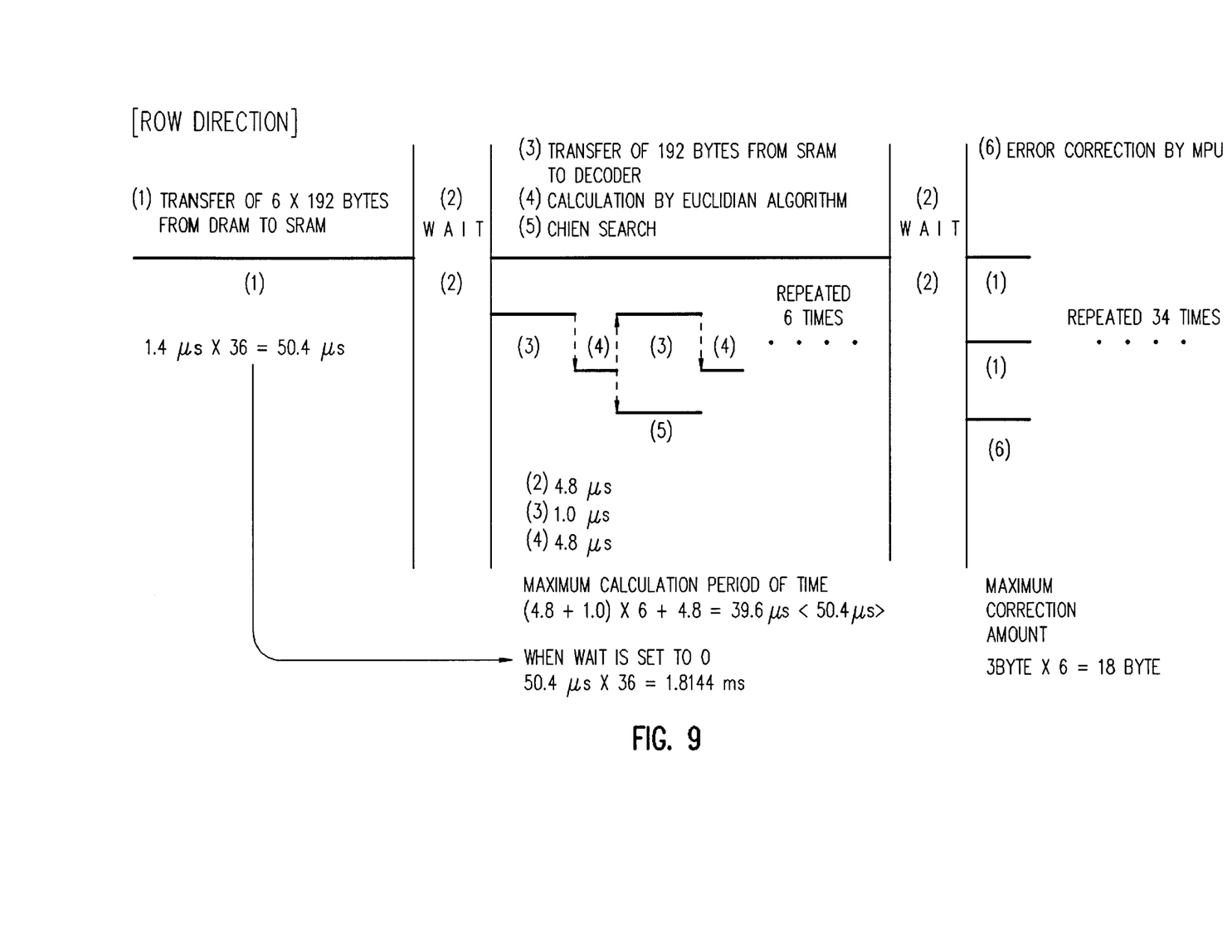
FIG. 9 is a diagram showing the flow of the transfer of row data and decoding according to an embodiment of the invention.

The transfer of row data and decoding are shown in FIG. 9. In FIG. 9, the maximum number of error corrections is limited to 3 bytes/row because: erasure correction is not required for row data; a reduction of the probability of error correction is desired; and a bandwidth of 1 word/1.4 æs is allocated for the MPU 20B so that the bandwidth on the ATAPI side is not reduced. In addition, after the calculation is completed, a 10 æs period of time remains during which the MPU 20B can execute another job.

When the time used, after the values and errors have been corrected, to determine whether or not the corrections were normally performed, i.e., 1.4 æs {(208 192)/32}=1.7472 ms, is added to the processing time, the total period of time is:

1.8144 ms+4.256 ms+1.7472 ms≈7.82 ms.

This period of time is considerably shorter than the time during which one data block is transferred by the DVD, {208 192 8}(bit)/27(Mbit/sec)≈11.83 ms, and On-the-fly correction can be satisfactorily performed.

Figure 10:
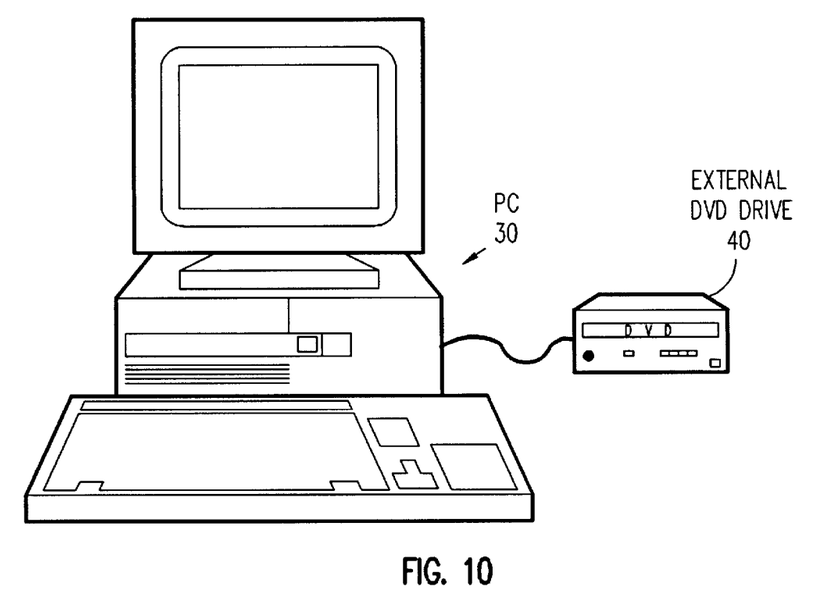
FIG. 10 is a diagram illustrating a connection example for an external DVD drive of the present invention and a PC according to an embodiment of the invention.
Figure 11:
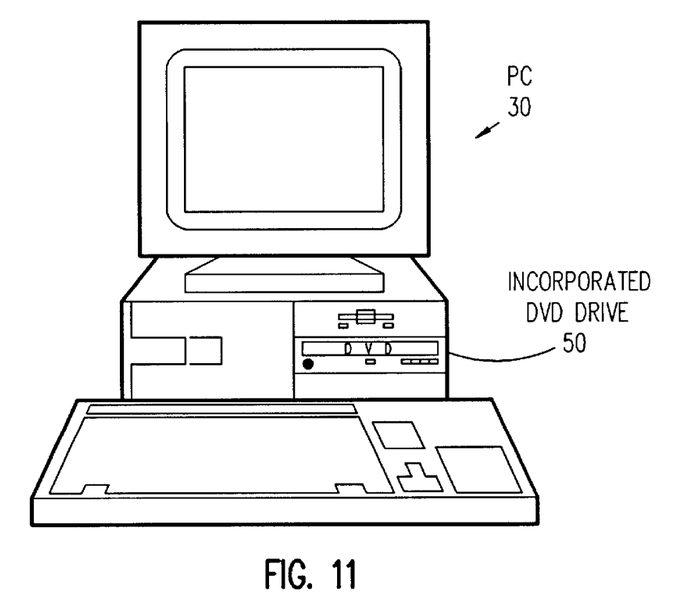
FIG. 11 is a diagram illustrating a PC wherein a DVD drive of the present invention is internally incorporated.

FIG. 10 is a diagram illustrating a connection example for an external DVD drive 40 and a PC 30, and FIG. 11 is a diagram illustrating a PC 30 wherein a DVD drive 50 is internally mounted.

As another embodiment, the first buffer 20A-1 may be SRAM while the second buffer 20A-2 may be higher speed DRAM. In addition, the number of banks that may be employed is three, and the values and the locations of errors that are acquired by a decoder may be written in the second buffer 20A-2. These examples can be realized without deviating from the essence of the present invention.

According to the present invention, it is possible to perform efficient data transfer processing so that real-time correction (on-the-fly correction) can be performed during decoding which uses a combination of product coding and erasure correction. When the erasure correction is performed, data can be read from a host (PC 30) without deterioration of the transfer performance.

We claim:

1. In a system, wherein a first buffer, a second buffer, a decoder and an MPU are connected to each other by a bus, a method of transferring data from a storage medium to a host, the data being initially read from the storage medium and stored in the first buffer, the data being encoded in a product code for error detection and correction, the method comprising the steps of:

(a) transferring a subset of the data in the product code from the first buffer to said second buffer;

(b) transferring a subset of the data from the second buffer to the decoder;

(c) while the subset of data is being received by the decoder, determining a number of errors in the data revealed by the product code;

(d) if the number of errors exceeds a threshold, increasing a portion of the system bandwidth used for error correction.

2. The method according to claim 1, further comprising the step of inserting a wait before a transfer of data from said first buffer to said second buffer is resumed if the number of errors exceeds a selected value.

3. The method according to claim 1, wherein step (a) transfers subsets of the data in a page mode.

4. The method according to claim 1, wherein the number of errors is found by said decoder using an error location polynomial and an error evaluation polynomial provided by a Euclidian algorithm.

5. The method according to claim 1, wherein said transfer step (b) further comprises selecting one of two or more banks comprising the second buffer to hold the data, and step (c) further includes the step of detecting when one bank is filled with data and the counting of errors in the bank is completed in a period during which data is transferred to one of more remaining banks.

6. The method according to claim 1, wherein the subsets of the data are columns and rows and when row data in said first buffer is transferred to said second buffer, a wait between said transfers of data is set by said MPU.

7. The method according to claim 1, wherein the transfer of subsets of data from said first buffer to said second buffer is performed in a burst mode.

8. The method according to claim 1, further comprising the steps of:
calculating syndromes for error correction;
calculating an error location polynomial and an error evaluation polynomial provided by a Euclidian algorithm; and
calculating error locations and values using a Chien search.

9. The method according to claim 8, wherein the step of calculating syndromes is performed while data is being transferred said second buffer to said decoder, so that said transfer of data from said second buffer and said Chien search are pipelined.

10. A system for reading encoded data from a storage medium, comprising:
first and second buffers which are interconnected to allow data to pass from the first buffer to the second buffer;
a decoder which counts errors in the data and is connected to the first and second buffers by a bus and is also directly connected to the second buffer;
an MPU connected to first and second buffers, and the decoder by the bus; a
means for transferring columns of data in said first buffer to said second buffer;
means for transferring rows of data in said first buffer to said second buffer; and
means for increasing a bandwidth allocation used for error correction when the number of errors exceeds a specified count.

11. The system according to claim 10, further comprising, means for inserting a wait before a transfer of data from said first buffer to said second buffer if the errors exceed a selected threshold.

12. The system according to claim 10, wherein said transfer means for transferring columns of data uses a page mode.

13. The system according to claim 10, further comprising means for calculating the error location polynomial and the error evaluation polynomial by a Euclidian algorithm.

14. The system according to claim 10, wherein the second buffer further comprises two or more banks, and the system further comprises means for beginning calculation of error numbers and error locations for data when one bank is filled with data, and for completing said calculation in a period during which data is transferred to the remaining banks.

15. The system according to claim 10, wherein, when said row data in said first buffer is transferred to said second buffer, a wait is set between said transfers of data.

16. The system according to claim 10, the means for transferring columns uses a burst mode.

17. The system according to claim 10, wherein the decoder includes means for calculating syndromes, means for calculating an error location polynomial and means for calculating an error evaluation polynomial provided by an Euclidian algorithm, and means for calculating error locations and values using a Chien search.

18. The system according to claim 17, wherein said syndrome calculation is performed at the same time as is a transfer of data from said second buffer to said decoder, so that data for a plurality of rows or a plurality of columns are present in said second buffer, and so that said transfer of data from said second buffer and said Chien search are pipelined.

19. A DVD player system for playing data recorded on a DVD, said system comprising:
a motor for rotating said DVD;
an optical pick-up for optically reading said data recorded on said DVD;
drive means for driving said motor and said optical pick-up; decoding means for correcting errors and transferring decoded data to a host; and
DVD controller means for transferring optical signal from said pick-up to said decoding means, and sending a servo operation command to said drive means based on control information within said data or control signal from said decoding means;
said decoding means, wherein a first buffer, a second buffer, a decoder and an MPU are connected to each other through a bus, further comprising
(a) means for transferring column data in said first buffer to said second buffer,
(b) means for starting a transfer of data from said second buffer to said decoder upon the detection of the number of errors,
(c) means for performing error correction for column data in said first buffer after next data transfer from said first buffer to said second buffer has started,
(d) means for transferring row data in said first buffer to said second buffer, and
(e) means for altering a bandwidth of said host to a lower level and for dynamically altering a bandwidth between said MPU and said first buffer to an upper level when the number of errors in one row on said first buffer exceeds a specified number.

20. The system according to claim 19, further comprising, if many errors exist in column in said first buffer, means (f) for inserting a wait before a transfer of data from said first buffer to said second buffer is resumed.

21. The system according to claim 19, wherein said transfer means (a) is means for transferring data in a page mode.

22. The system according to claim 19, wherein in said means (b) the number of errors is calculated by said decoder using the error location polynomial and the error evaluation polynomial provided by the Euclidian algorithm.

23. The system according to claim 19, wherein said transfer means (d) includes means for dividing said second buffer into two or more banks, for beginning calculation of errors and error locations for data when one bank is filled with data, and for completing said calculation in a period during which data is transferred to the remaining banks.

24. The system according to claim 19, wherein, when said row data in said first buffer is transferred to said second buffer, in said means (d) a wait is set between said transfers of data from said MPU.

25. The system according to claim 24, wherein in said means (d) said wait for data transfer is set to 0, and a transfer of data from said first buffer to said second buffer is performed in a burst mode.

26. The system according to claim 19, wherein processing performed by said decoder includes three stages: syndrome calculation, calculation of the error location polynomial and the error evaluation polynomial provided by the euclidian algorithm, and calculation of error locations and values by using a Chien search.

27. The system according to claim 26, wherein said syndrome calculation is performed at the same time as is a transfer of data from said second buffer to said decoder, so that data for a plurality of rows or a plurality of columns are present in said second buffer, and so that said transfer of data from said second buffer and said Chien search are pipelined.

* * * * *